Patented Jan. 29, 1924.

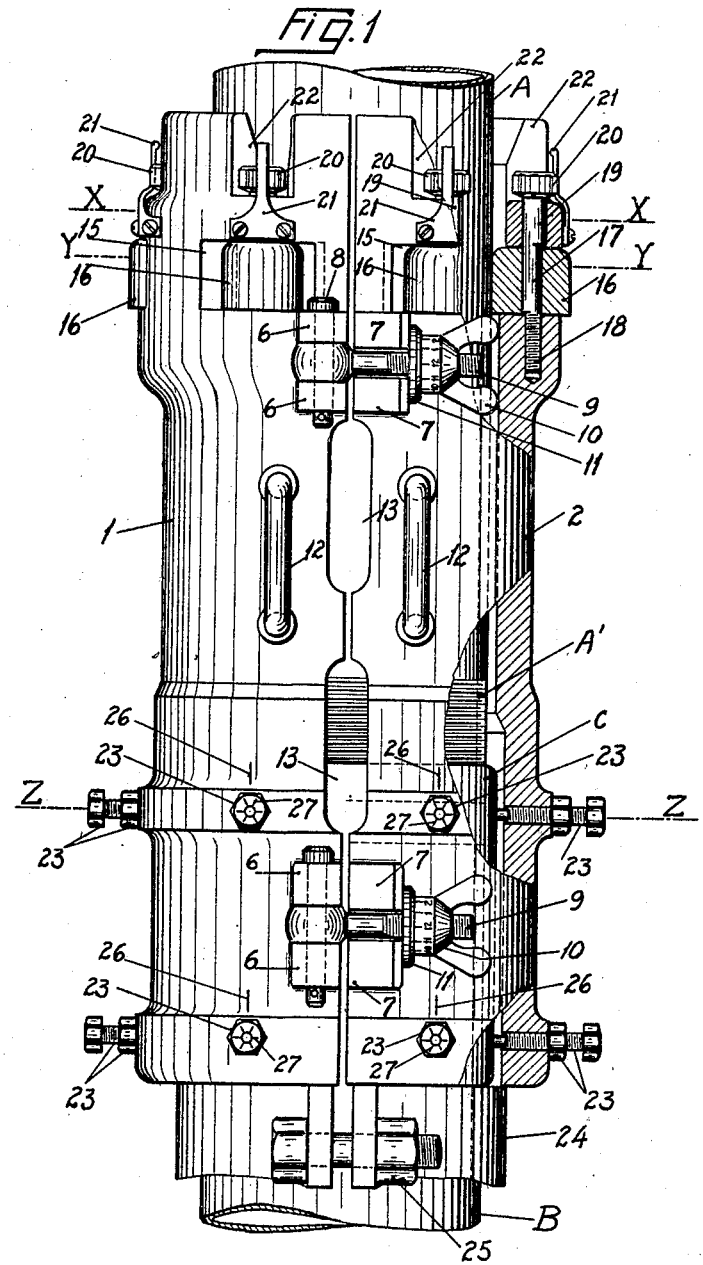

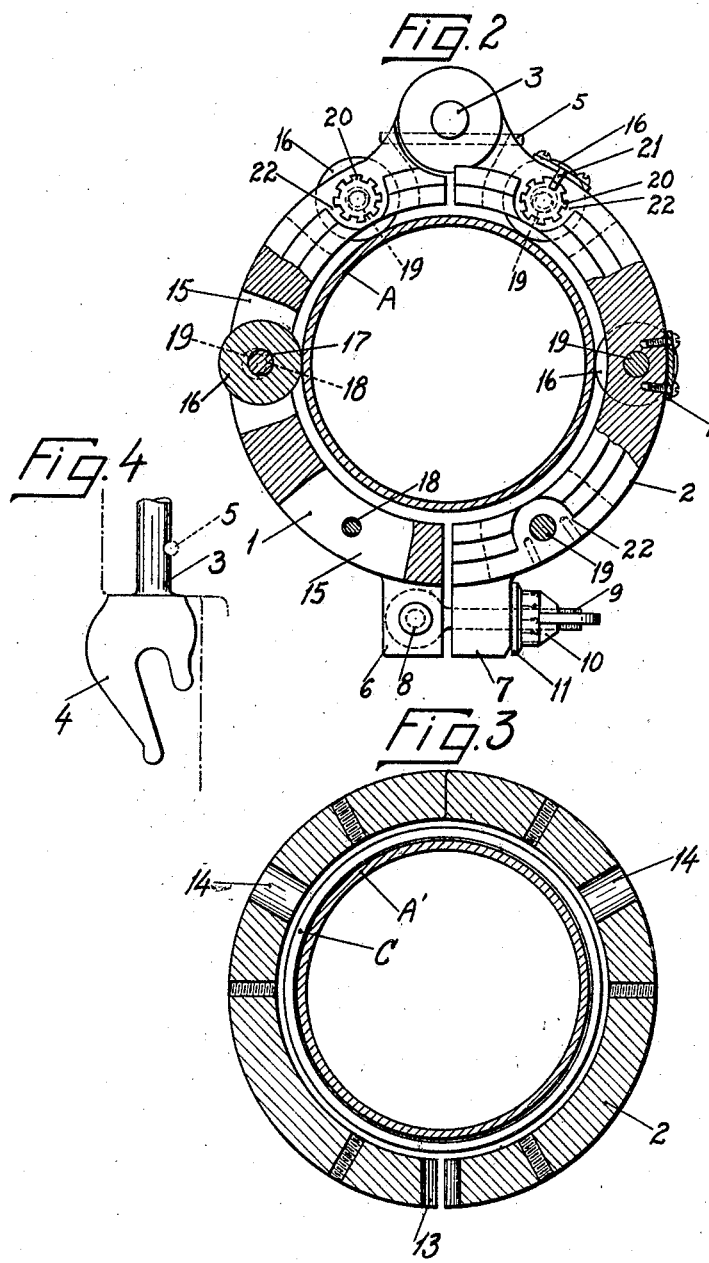

1,482,162

UNITED STATES PATENT OFFICE.

JOSEPH STREDA, OF LONDON, ENGLAND.

DEVICE FOR ALIGNING PIPES FOR CONNECTION.

Application filed December 4, 1922. Serial No. 604,942.

*To all whom it may concern:*

Be it known that I, JOSEPH STREDA, a citizen of the Czechoslovakian Republic, residing at London, England, have invented certain Improvements in Devices for Aligning Pipes for Connection, for which I have filed applications in Czechoslovakia on November 22d, 1921; Great Britain, July 29th, 1922; Germany, September 29th, 1922, of which the following is a specification.

This invention relates to a device whereby pipes, particularly those used in the boring of petroleum and like wells, can be aligned for facilitating their connection, and consists in the provision of a sleeve which is centred by means of radial screws on the end of one of the pipes and provided with guide rollers whereby the other pipe is held in a properly centred position relative to the first pipe so that it can be connected to the latter in perfect alignment therewith, without difficulties and without damaging the screw-threads.

Fig. 1 of the drawings represents an elevation of the device, partly in section, and Fig. 2, a plan of the same in section, partly on the line X—X and partly on the line Y—Y of Fig. 1.

Fig. 3 is a cross-section on the line Z—Z of Fig. 1, and

Fig. 4, a view of one of the details.

The device consists of a sleeve which is divided longitudinally into two halves 1 and 2, the latter being hingedly connected at two points. The hinge pins 3 are secured to the sockets by means of tangential locking pins 5, and the upper hinge pin is formed with a hook 4 (Fig. 4) whereby the sleeve can be suspended. At the free edges of the sleeve parts there are two pairs of forked brackets 6 and 7, one of each pair being adapted to receive the eyelet of a clamp screw 9 which is held in position by means of a pivot pin 8. The other bracket of each pair sits on the opposite part of the sleeve and it is adapted to receive the stem of the screw and to support, by means of a washer 11, a nut 10 whereby the parts 1 and 2 can be clamped together for the completion of the sleeve. The nuts are graduated so that both ends of the sleeve can be contracted to a uniform and predetermined extent. The sleeve parts are provided with handles 12 and with notches 13 through which latter the progress of the pipe connection can be watched. Two distanced circumferential fillets on the lower part of the sleeve are fitted with screws 23 the ends of which project radially into the interior of the sleeve. The screw-heads are provided with graduations 27 which enable them to be set uniformly with reference to indices 26 on the sleeve. The thickened upper end of the sleeve is formed with equidistant slots 15 for the accommodation of rollers 16 which are arranged so as to project into the interior of the sleeve. Above the slots 16 there are recesses 22 for the accommodation of the heads 20 of pins 19 about which the rollers 16 are adapted to turn. The pins 19 are each fitted with a screw-threaded portion 18 for connection with the sleeve and with an eccentric portion 17 by which the roller is controlled. By a rotary adjustment of the pin, therefore, the roller can be made to project more or less into the interior of the sleeve. The heads 20 are notched for engagement with spring catches 21 which thereby retain the rollers in adjusted position.

In the use of the device, one of the pipes B, which is fitted with the usual screw-socket C, is rigidly secured by means of a clamp screw 25 to a firmly supported collar 24. The latter is applied close to the socket C and serves at the same time as a support for the aligning sleeve. When all is ready for the connection of the pipe A, the aligning sleeve is suspended by means of the hook 4 on the hoisting cable, the parts 1 and 2 are opened out, and the sleeve is manipulated by means of the handles 12 and applied with its lower part to the socket C. Then the lower bolt 9 is turned into engagement with the bracket 7, and the nut 10 is screwed up a predetermined amount so as to clamp the ends of the screws 23 to the socket C. The screws should be previously adjusted so that the tightening up of the nut 10 causes the sleeve to be properly centred on and firmly secured to the socket C. If any of the sockets should happen to deviate from the standard outside dimension, a small correction may be effected by means of the nut 10 and a larger one by a re-setting of the screws 23, the graduations 27 enabling the readjustment to be uniformly effected. After the sleeve has been fixed to the socket C, the new pipe A may be inserted, whereupon the upper nut 10 is tightened up to the same extent as the lower one. The rollers 16, should then support the pipe and allow it to be turned without too much friction for connecting the screw-threaded portion A¹ to the socket C. The rollers are previously adjusted so that the pipe will be properly centred, and deviations in the outside dimension can also here be compensated for by a readjustment of the bolt-heads 20 an equal number of notches, smaller deviations being compensated for by means of the nut 10. The notches in the heads 20 may be numbered to facilitate the adjustment.

The pipe A, being centred by the sleeve and held by the same in true alignment with the pipe B, will easily find its way into the socket C, and all risks of bending the pipe or damaging the screw-thread will be obviated. The boring column will be perfectly straight and will advance in a straight line. Thus the friction will be reduced to a minimum, and time and materials will be saved.

I claim:

1. A device for aligning pipes for connection, comprising a sleeve adapted to receive the pipe ends, radial screws fitted in the lower part of the sleeve for centering the sleeve on and securing it to the pipe end, and adjustable rollers mounted in the upper part of the sleeve so as to hold the other pipe in alignment with the first one while both are screwed together.

2. A device for aligning pipes for connection, comprising a sleeve divided longitudinally into two hingedly connected halves, pivoted clamp screws for closing the two halves about the pipe ends, the screws being provided with graduated nuts to ensure uniformity of adjustment, radial screws fitted in the lower part of the sleeve for centering the sleeve on and securing it under the influence of the clamp screws to one pipe end, and adjustable rollers mounted in the upper part of the sleeve so as to hold the other pipe in alignment with the first one while both are screwed together.

3. A device for aligning pipes for connection, comprising a sleeve divided longitudinally into two hingedly connected halves, pivoted clamp screws with graduated nuts for closing the two halves about the pipe ends, radial screws with graduated heads fitted in the lower part of the sleeve for centering the sleeve on and securing it under the influence of the clamp screws to one pipe end, and adjustable rollers mounted in the upper part of the sleeve so as to hold the other pipe in alignment with the first one while both are screwed together.

4. A device for aligning pipes for connection, comprising a sleeve divided longitudinally into two hingedly connected halves, pivoted clamp screws with graduated nuts for closing the two halves about the pipe ends, radial screws with graduated heads fitted in the lower part of the sleeve for centering the sleeve on and securing it, under the influence of the clamp screws, to one pipe end, rollers mounted on eccentric pivots in the upper part of the sleeve so that they can be adjusted for holding the other pipe in alignment with the first one while both are screwed together, notched heads on the roller pivots, and spring catches adapted to engage the notches of said heads so as to hold them in adjusted position.

5. A device for aligning pipes for connection, comprising a sleeve adapted to receive the pipe ends, radial screws fitted in the lower part of the sleeve for centering the sleeve on and securing it to one pipe end, a collar for securing said pipe end and supporting the sleeve while applied to the same, and adjustable rollers mounted in the upper part of the sleeve so as to hold the other pipe in alignment with the first one while both are screwed together.

JOSEPH STREDA.